(12) United States Patent
Claramunt Estecha et al.

(10) Patent No.: US 11,598,317 B2
(45) Date of Patent: Mar. 7, 2023

(54) YAW BEARINGS FOR A WIND TURBINE

(71) Applicant: General Electric Renovables Espana, S.L., Barcelona (ES)

(72) Inventors: Santiago Claramunt Estecha, Barcelona (ES); Javier Garcia Cervilla, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/344,303

(22) Filed: Jun. 10, 2021

(65) Prior Publication Data

US 2021/0388821 A1  Dec. 16, 2021

(30) Foreign Application Priority Data

Jun. 11, 2020 (EP) .................................... 20382506

(51) Int. Cl.
*F03D 80/70* (2016.01)
*F03D 15/20* (2016.01)
*F03D 80/80* (2016.01)

(52) U.S. Cl.
CPC ............. *F03D 80/70* (2016.05); *F03D 15/20* (2016.05); *F03D 80/88* (2016.05); *F05B 2240/50* (2013.01); *F05B 2260/79* (2013.01); *F05B 2260/902* (2013.01)

(58) Field of Classification Search
CPC .... F03D 7/0204; F03D 7/0208; F03D 7/0212; F03D 80/70; F03D 80/88
See application file for complete search history.

(56) References Cited

U.S. PATENT DOCUMENTS

| | | | |
|---|---|---|---|
| 7,458,776 B2 | 12/2008 | LLorente Gonzalez et al. |
| 8,164,211 B2 | 4/2012 | Numajiri |
| 8,177,510 B2 | 5/2012 | Nies et al. |
| 8,317,462 B2 | 11/2012 | Daniels et al. |
| 8,550,769 B2 | 10/2013 | Behnke et al. |
| 9,359,995 B2 | 6/2016 | Trede et al. |
| 9,581,137 B2 | 2/2017 | Canedo Pardo |
| 9,689,174 B2 * | 6/2017 | Gotfredsen ............ F16C 33/26 |
| 2010/0038192 A1 | 2/2010 | Culbertson |
| 2011/0012360 A1 | 1/2011 | Numajiri |
| 2011/0057451 A1 | 3/2011 | Volmer et al. |
| 2011/0233939 A1 | 9/2011 | Noda et al. |
| 2011/0254281 A1 | 10/2011 | Noda et al. |

(Continued)

FOREIGN PATENT DOCUMENTS

| | | |
|---|---|---|
| CN | 201292914 Y | 8/2009 |
| CN | 201650589 U | 11/2010 |

(Continued)

OTHER PUBLICATIONS

EP Search Report Corresponding to EP20382506 dated Nov. 2, 2020.

*Primary Examiner* — Christopher R Legendre
(74) *Attorney, Agent, or Firm* — Dority & Manning, P.A.

(57) ABSTRACT

A gliding yaw bearing system for use in a wind turbine includes a first bearing assembly configured for being attached to a tower of the wind turbine, a second bearing assembly configured for being attached to a nacelle of the wind turbine. An upwind section of the second bearing assembly is different from a downwind section of the second bearing assembly. A wind turbine utilizing the gliding yaw bearing system is also encompassed herein.

13 Claims, 6 Drawing Sheets

(56) References Cited

U.S. PATENT DOCUMENTS

| | | |
|---|---|---|
| 2011/0299975 A1 | 12/2011 | Pechlivanoglou |
| 2013/0032436 A1 | 2/2013 | Boehm et al. |
| 2016/0245258 A1 | 8/2016 | Firkser et al. |
| 2016/0333860 A1 | 11/2016 | Winslow et al. |
| 2017/0159643 A1 | 6/2017 | Kim |
| 2020/0173424 A1 * | 6/2020 | Claramunt Estecha ................ F03D 80/70 |

FOREIGN PATENT DOCUMENTS

| | | | |
|---|---|---|---|
| CN | 103184973 B | 9/2015 | |
| CN | 103785989 B | 5/2016 | |
| EP | 2620644 A1 | 7/2013 | |
| EP | 3165764 A1 | 5/2017 | |
| EP | 3904709 A1 * | 11/2021 | ............ F03D 80/70 |
| GB | 2052006 A | 1/1981 | |

* cited by examiner

YAW BEARINGS FOR A WIND TURBINE

The present disclosure relates to yaw systems for wind turbines, particularly gliding yaw bearings for wind turbines and wind turbines comprising such yaw systems.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

Most wind turbines comprise a yaw system used for orienting the rotor of the wind turbine in the prevailing wind direction.

The yaw system normally performs this rotation of the nacelle by means of a yaw drive that includes a plurality of (electric or hydraulic) motors with suitable gearboxes for driving gears (pinions) that mesh with an annular gear or gear ring attached to the nacelle or to the wind turbine tower. The nacelle, to which the wind turbine rotor is mounted, can thus be rotated around the tower's longitudinal axis in or out of the wind direction. The rotatable connection between the wind turbine tower and the nacelle is called a yaw bearing.

Normally, when the rotor is aligned with the wind direction, the yaw system maintains the position by means of brakes (e.g. hydraulic brake calipers and/or electro-brakes of the yaw motors). When the rotor is misaligned from the wind direction during operation, the yaw system rotates the nacelle to reach an appropriate alignment with the wind. In specific circumstances, the yaw system may also be used to orient the wind turbine rotor out of the wind direction, e.g. in certain storm conditions.

The yaw bearing can be of the roller or gliding type. Roller yaw bearings may in general comprise balls or rolling elements arranged between an inner ring and an outer ring for reducing the friction between these rings. As the friction between the inner and the outer rings is very low, yaw systems having roller bearings may require the yaw motors and the braking systems to be constantly activated for maintaining a yaw direction. As a result, braking systems and yaw motors are commonly oversized. Further, roller bearings are relatively costly when compared to other bearings, especially large yaw roller bearings.

Gliding yaw bearings or sliding yaw bearings form an alternative for a roller yaw bearing, and they are known to be used in large wind turbines because they are cheaper than roller yaw bearings and are able to withstand high loads in axial and radial directions. Gliding or sliding yaw bearings may include an annular gear or gear ring configured to be fixed to the tower wherein the frame of the nacelle may rest and slide in its yawing movement. Lubrication, e.g. oil or grease, may be applied between the annular gear and the frame of the nacelle for allowing the frame to rotate with respect to the annular gear. Lubrication reduces the friction between the annular gear and the frame of the nacelle and avoids the wear of the annular gear and/or the frame. In addition, a sliding or gliding surface may be provided between the annular gear and the frame to avoid a direct contact between them.

An example of a gliding yaw bearing is disclosed in U.S. Pat. No. 7,458,776.

SUMMARY

In one aspect, a gliding yaw bearing system for use in a wind turbine is provided. The gliding yaw bearing system comprises a first bearing assembly configured for being attached to a tower of the wind turbine, and a second bearing assembly configured for being attached to a nacelle of the wind turbine. An upwind section of the second bearing assembly is different from a downwind section of the second bearing assembly.

In accordance with this aspect, a gliding yaw bearing is provided which accounts for the asymmetric mass distribution in wind turbines, which leads to bending loads which are predominantly or constantly in the same direction. In particular, in direct drive wind turbines, where the wind turbine rotor and generator are located with respect to the tower and yaw system. The upwind and downwind sections of the yaw bearing are therefore subjected to different loads. The bearing assembly that is attached to the nacelle will rotate with the nacelle when the wind changes and the yaw system is activated. Sections of the bearing assembly attached to the nacelle can thus be defined which are always subjected to bending loads in the same direction. The loads on the upwind and downwind sections will be different, and therefore sections of the bearing assembly attached to the nacelle can be adapted for different loads.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
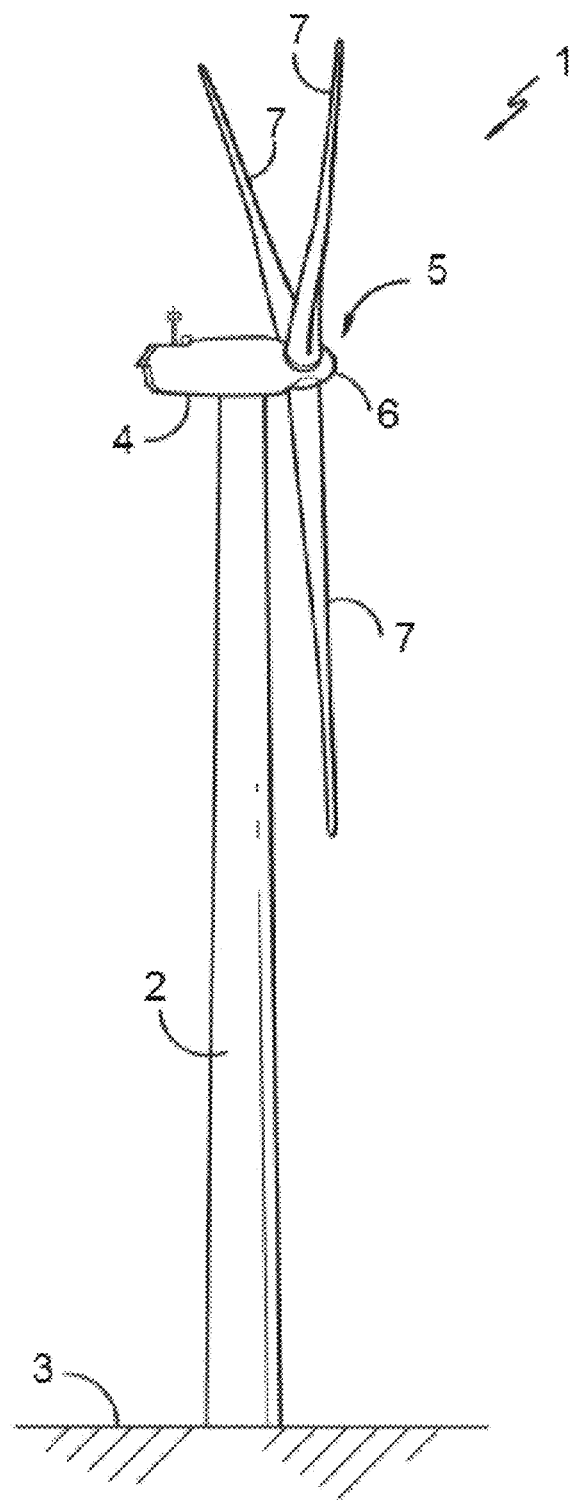
FIG. 1 illustrates a perspective view of a known wind turbine.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG.

2) positioned within the nacelle 4 or forming part of the nacelle to permit electrical energy to be produced.

Figure 2:
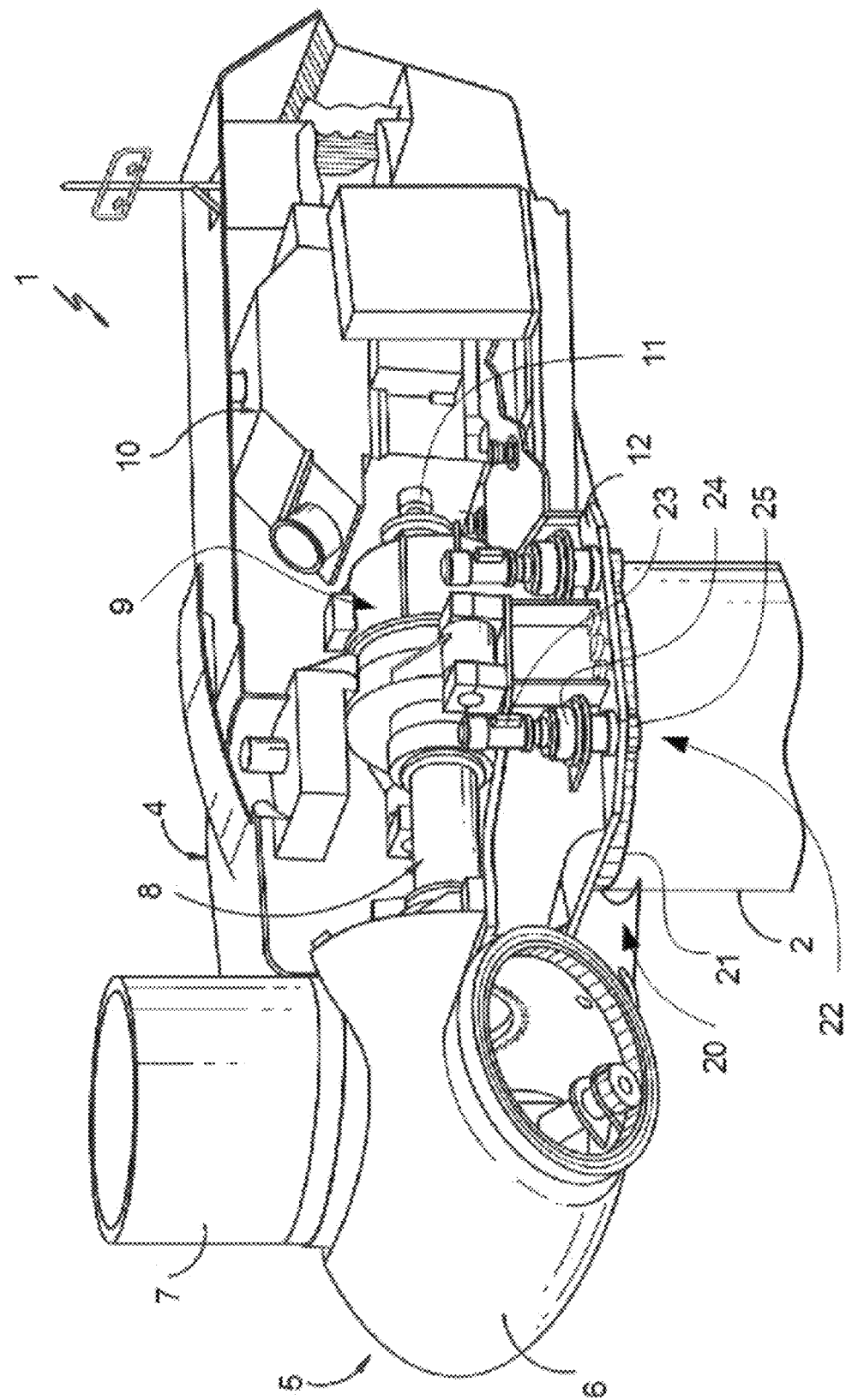
FIG. 2 illustrates a simplified, internal view of a nacelle of a wind turbine according to FIG. 1.

FIG. 2 illustrates a simplified, internal view of one example of the nacelle 4 of the wind turbine 1 of the FIG. 1. As shown, the generator 10 may be disposed within the nacelle 4. In general, the generator 10 may be coupled to the rotor 5 of the wind turbine 1 for generating electrical power from the rotational energy generated by the rotor 5. For example, the rotor 5 may include a main rotor shaft 8 coupled to the hub 5 for rotation therewith. The generator 10 may then be coupled to the rotor shaft 8 such that rotation of the rotor shaft 8 drives the generator 10. For instance, in the illustrated embodiment, the generator 10 includes a generator shaft 11 rotatably coupled to the rotor shaft 8 through a gearbox 9.

It should be appreciated that the rotor shaft 8, gearbox 9, and generator 10 may generally be supported within the nacelle 4 by a bedplate or a support frame 12 positioned atop the wind turbine tower 2.

The nacelle 4 is rotatably coupled to the tower 2 through a yaw system 20. The yaw system comprises a yaw bearing (not visible in FIG. 2) having two bearing components configured to rotate with respect to the other. The tower 2 is coupled to one of the bearing components and the bedplate or support frame 12 of the nacelle 4 is coupled to the other bearing component. The yaw system 20 comprises an annular gear 21 and a plurality of yaw drives 22 with a motor 23, a gearbox 24 and a pinion 25 for meshing with the annular gear for rotating one of the bearing components with respect to the other.

The yaw system 20 may be used to orient the nacelle 4 and rotor 5 to align with the prevailing wind direction during operation. In specific circumstances, e.g. storm conditions, the yaw system may be used to rotate the nacelle 4 out of the wind direction.

Figure 3A:
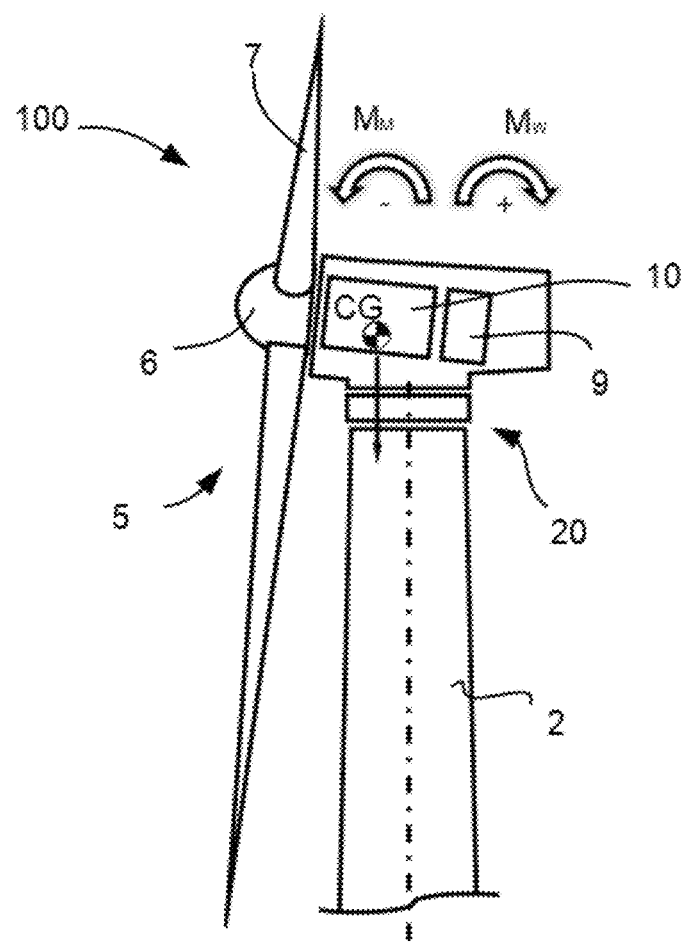
FIGS. 3A and 3B schematically illustrate how loads may differ in a direct drive wind turbine as compared to a wind turbine having a gearbox.
Figure 3B:
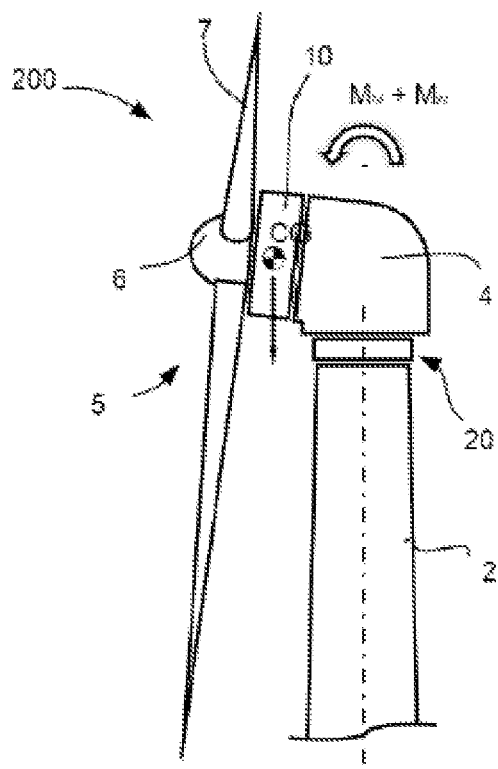

FIGS. 3A and 3B schematically illustrate how loads may differ in a direct drive wind turbine as compared to a wind turbine having a gearbox. In both FIGS. 3A and 3B, a wind turbine with a wind turbine rotor on an upwind side of the tower is disclosed.

Upwind wind turbines have the rotor facing the wind on the front side of the tower. The basic advantage of upwind designs is that one avoids the wind shade behind the tower. A large majority of wind turbines have this design. Downwind machines have the rotor placed on the lee side of the tower. They have the theoretical advantage that they may be built without a yaw drive mechanism, if the rotor and nacelle have a suitable design that makes the nacelle follow the wind passively.

In FIG. 3A, a wind turbine 100 which resembles wind turbine 1 of FIGS. 1 and 2 is disclosed. A wind turbine rotor comprises a hub 6 and a plurality of blades 7. A rotor shaft connected to hub 6 forms a "low speed shaft" of a gearbox 9. An output shaft or "high speed shaft" of gearbox 9 is configured to drive a generator 10. Both the gearbox 9 and generator 10 are housed within a nacelle 4. Nacelle 4 is rotatably mounted on tower 20 through a yaw bearing system 20.

Although other components may be housed in the nacelle, the gearbox 9 and the generator 10 typically are the heaviest components. The rotor 5 with hub 6 and blades 7 forms an additional heavy component. The resulting center of gravity CG is schematically indicated in FIG. 3A. The center of gravity may be located on the upwind side of the central axis of the tower 2. The tower 2 is thus subjected to a bending load (bending moment due to mass $M_M$) as a result of the weight distribution of the rotor and nacelle. The bending moment due to the mass is in this figure regarded as a negative moment.

In operation, under wind loads, an additional moment $M_W$ due to the wind may arise. This moment due to wind loads is not constant. Depending on the magnitude of the (positive) moment $M_W$ as compared to the negative moment $M_M$, at times the tower (and the yaw system) may be subjected to positive bending loads, i.e. $M_W - M_M > 0$.

Therefore, at times, the tower and yaw system will experience a bending moment in the negative direction, and at other times, they will experience a bending moment in the positive direction.

FIG. 3B schematically illustrates a direct drive wind turbine 200. As opposed to wind turbine 100, the rotor 5 directly drives a rotor of generator 10. Generator 10 may be located in front of the nacelle 4, i.e. on the upwind side of nacelle 4, and partially or completely in front of it. The resulting bending moment $M_M$ can be larger than the bending moment $M_M$ in FIG. 3A. So, even if large positive bending moments arise during operation due to wind loads $M_W$, the resulting moment will still be negative. As a result, in direct drive wind turbines, tower 2 and yaw system 20 may be constantly subjected to a negative bending load.

Figure 4:
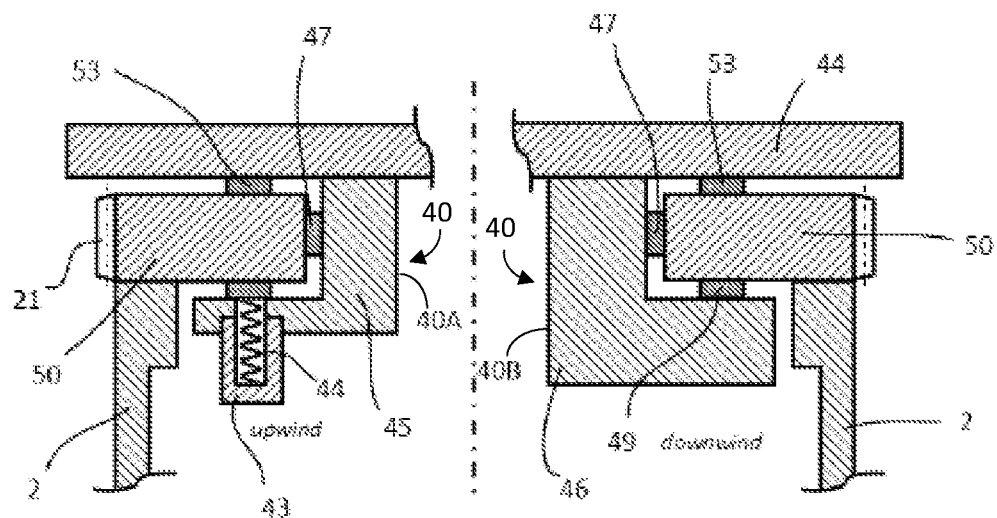
FIG. 4 schematically illustrates a yaw system according to one example.

FIG. 4 schematically illustrates a yaw system according to one example. FIG. 4 illustrates a gliding yaw bearing system for use in a wind turbine comprising a first bearing part 50 configured for being attached to a tower 2 of the wind turbine, and a second bearing part 40 configured for being attached to a nacelle 4 of the wind turbine. An upwind section 40A of the second bearing part is different from a downwind section 40B of the second bearing part. Although the gliding yaw bearing(s) illustrated herein are specifically suitable for direct drive wind turbines, they may be used in wind turbines having a gearbox as well.

Specifically, in this example, the second bearing assembly may be configured to be able to support higher bending loads on the upwind side of the nacelle.

The second bearing part 40 may be attached to a nacelle frame 44 or bedplate. In the particular example of FIG. 4, a wind turbine rotor and generator may be arranged on an upwind side of tower 2. On the upwind section 40A, the nacelle frame 40 will have a tendency to push down because of the mass of the generator and wind turbine rotor on the upwind side. On the downwind section, the nacelle frame will have a tendency to pull upwards for the same reason.

The second bearing part 40 may comprise a plurality of nacelle gliding pads. 47, 49. The first bearing part 50 may comprise a plurality of tower gliding pads 53. The nacelle and tower gliding pads 47, 49, 53 form a gliding assembly so that the nacelle can slide or slide over the tower when the yaw drives act on the annular gear. Lubricant may be provided between the first and second bearing part.

In this specific example, the first bearing part comprises an annular disk 50 having tower gliding pads 53. The gliding tower pads 53 may be attached to an upper surface of the disk 50. The pads may e.g. be screwed to the upper surface of disk 50.

The annular disk 50 includes a top axial gliding surface, a bottom axial gliding surface and a radial gliding surface. The second bearing part may include calipers that partially enclose the second bearing component. The second bearing part may also include a top axial gliding surface, a bottom axial gliding surface and a radial gliding surface. The top axial gliding surface of the first bearing part in use may face the top axial gliding surface of the second bearing part.

Similarly, the bottom axial gliding surfaces and the radial gliding surfaces may respectively face each other.

The second bearing part 40 may comprise a plurality of calipers 45, 46. The calipers may be formed by brackets with a substantially L-shaped cross-section which may be attached to the nacelle frame 44. They may be attached using e.g. screws. Other shapes than L-shapes may also be used, e.g. brackets with a C-shaped cross-section, and any other shape to partially encompass or limit the movement of the disk 50.

In this specific example, the calipers 45, 46 comprise bottom gliding pads 49 configured to contact a bottom of the disk 50. The calipers 46 may comprise radial gliding pads 47 configured to contact a radial surface of the disk. In this particular example, the radial gliding pads 47 attached to the calipers establish contact with an inner radial surface of annular disk 50.

The radial gliding pads may in some examples be wedge shaped.

The number and configuration of calipers 46 may be different in a downwind section than the calipers 45 in the upwind section. Due to the loads that were described hereinbefore, the calipers 46 may be subjected to higher loads than calipers 45 in the upwind section. The calipers 46 may have a larger cross-sectional area, taken along an axial-radial plane, than calipers 45. Additionally or alternatively, the number of calipers in the downwind section may be higher than in the upwind section. The density of calipers, i.e. the number of calipers per unit of length along the perimeter of the tower may be higher in the downwind section.

Additionally or alternatively, a material of the calipers 45 may be different from the material of the calipers 46. E.g. they may be of a higher grade, having e.g. a higher tensile strength, and yield strength.

Additionally or alternatively, the calipers 45 on the upwind side may comprise a mechanism to increase friction between the first bearing part and the second bearing part. In particular, the bottom pads 49 of the calipers 45 may be pushed towards the annular disk 50. The mechanism 43 may include e.g. a spring 44 pushes bottom pad 49 in contact with a bottom of annular disk 50 to increase friction. Additionally or alternatively, a pneumatic or hydraulic mechanism to increase friction may be used. In the upwind section, because of the loads described before, the friction on a bottom side of the annular disk may be relatively low.

The same or similar friction increasing mechanisms may be included on the downwind side with respect to the upper pad. Due to the bending moments due to the mass, both on the downwind upper side, and on the upwind lower side, there is tendency for the first and second bearing assemblies to separate. Friction increasing mechanisms as described before may be helpful. The phenomenon for the downwind upper side, and downwind lower side is true for an upwind wind turbine rotor. It would be the other way around for downwind wind turbine rotors.

In some examples, a number of nacelle gliding pads may be higher in the downwind section of the second bearing part than in the upwind section of the second bearing part. In some examples, a material of the nacelle gliding pads is different in the downwind section of the second bearing part than in the upwind section of the second bearing part. E.g. the material of the nacelle gliding pads in the downwind section may be of a higher grade, i.e. have a higher strength or resistance than the nacelle gliding pads in the upwind section.

In this example, the annular disk may comprise gear teeth 21 on a radial surface of the disk 50.

In an aspect of the present disclosure, a direct drive wind turbine is provided comprising a tower 2, a nacelle 4 rotatably mounted on the tower 2, and a gliding yaw bearing system 20 according to any of the examples disclosed herein. The direct drive wind turbine 200 may further comprise a wind turbine rotor and a generator operatively connected with the wind turbine rotor, wherein the wind turbine rotor and the generator are arranged on an upwind side of the tower.

In an aspect of the present disclosure, a direct drive wind turbine having a tower, a nacelle rotatably mounted on the tower through a gliding yaw bearing, a wind turbine rotor and a generator operatively connected with the wind turbine rotor. The generator and the wind turbine rotor are arranged on a first side of the nacelle, and the gliding yaw bearing comprises a first bearing part coupled to the tower and comprising a plurality of gliding tower pads, and a second bearing part coupled to the nacelle and comprising a plurality of nacelle gliding pads, wherein the second bearing assembly is configured to be able to support higher loads on a second side of the nacelle.

In examples, a number and/or a type of nacelle gliding pads are different on the first side of the nacelle, than on a second side.

The number of the nacelle gliding pads may be varied by varying the number of calipers on the first and second side of the nacelle as was shown in the previous examples. Additionally or alternatively, angular segments covered by individual calipers may also be varied.

In some examples, the first bearing part may include a disk comprising the gliding tower pads. In these examples, the second bearing part comprises a plurality of calipers including the nacelle gliding pads. The calipers may comprise bottom gliding pads configured to contact a bottom of the disk.

In alternative examples, the first bearing part attached to the tower may include calipers, and the second bearing part may include an annular disk partially encompassed by the calipers.

The pads shown in any of the herein disclosed examples may be connected either to the first bearing part (attached or to the tower) or to the second bearing part (attached to the nacelle), or some to the first bearing part and others to the second bearing part.

In yet some further examples, the calipers attached to the nacelle may carry both bottom, and top gliding pads. In such examples, both the top and bottom gliding pads may be varied i.e. both top and bottom gliding pads may have an asymmetric configuration. Their number, size and materials may be varied along a circumference of the tower.

Figure 5A:
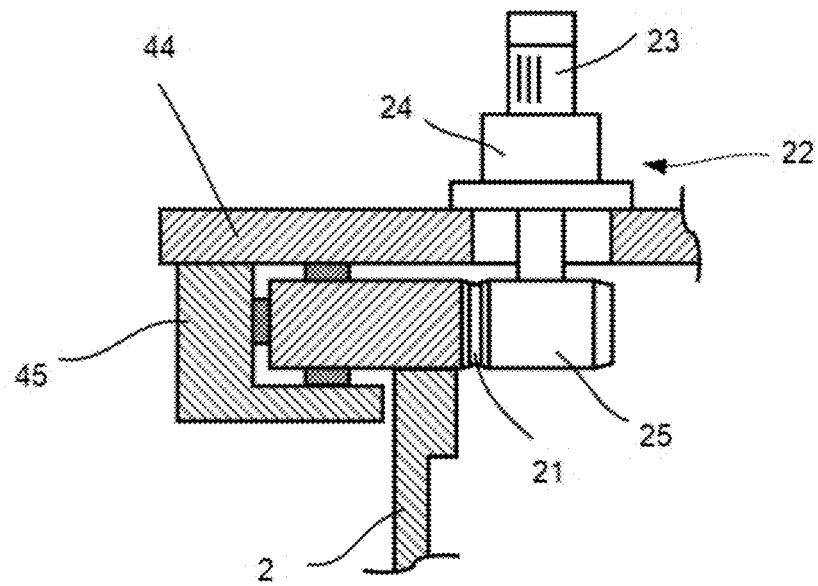
FIGS. 5A and 5B schematically illustrate different examples of yaw systems.
Figure 5B:
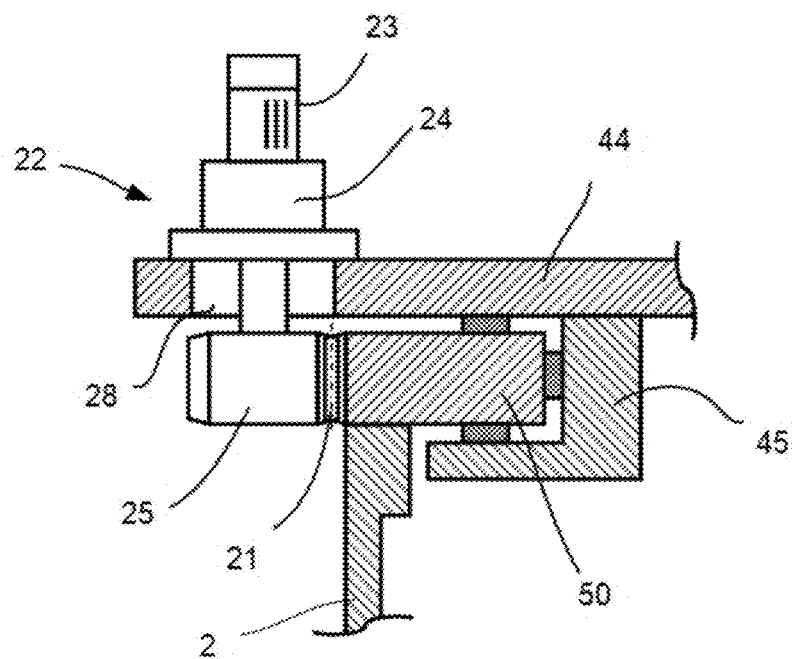

FIGS. 5A and 5B schematically illustrate different examples of yaw systems 20.

The yaw system may comprise an annular gear 21 coupled to the tower 2 and a plurality of yaw drives 22 coupled to the nacelle frame 44. The yaw drives 22 comprise a motor and a pinion 25 for meshing with the annular gear 21. The rotation of the pinon may rotate the pinion with respect to annular gear 21. In this example, the annular gear 21 is coupled to the first bearing part. The first bearing part may therefore rotate with respect to the second bearing part.

The yaw drives 22 in the example of FIG. 5A are arranged on an inside of the tower. The annular gear 21 is also provided on an inside of the tower.

FIG. 5B schematically illustrates a yaw system 20 with external yaw drives 22 with a pinion 25 that engages an annular gear 21 coupled to the tower 2. The first bearing part comprises a guiding plate including the annular gear 21 and is connected to the tower 2. The yaw drives 22 are exterior in this example, in the sense that they are outside of a perimeter of the tower 2.

In some of these examples, the gliding plate may be integrally formed with at least one of the annular gear 21 or the tower 2. In some examples, the gliding plate may be formed by several parts or segments.

In some examples, the nacelle frame 44 may comprise a plurality of mounting holes 28 to fit yaw drives 22. In some examples, the annular gear 21 may be connected, e.g. welded or fastened, to the gliding plate. The annular gear 21 and the gliding plate may form an integral part.

In all examples disclosed herein, the gliding yaw bearing comprises three general surfaces covered with multiple gliding pads. These gliding pads come in sliding contact with a steel disk, which is equipped with gear teeth to form a gliding-disk/gear-rim. The teeth may be located at the inner or the outer cylindrical face of the disk, while the arrangement of the gliding pads and their exact number and location vary strongly among the existing designs.

The pads in any of these examples may be manufactured out of polymer plastics such as polyoxymethylene plastic (POM), Polyethylene terephthalate (PET), or polyamide (PA).

Figure 6:
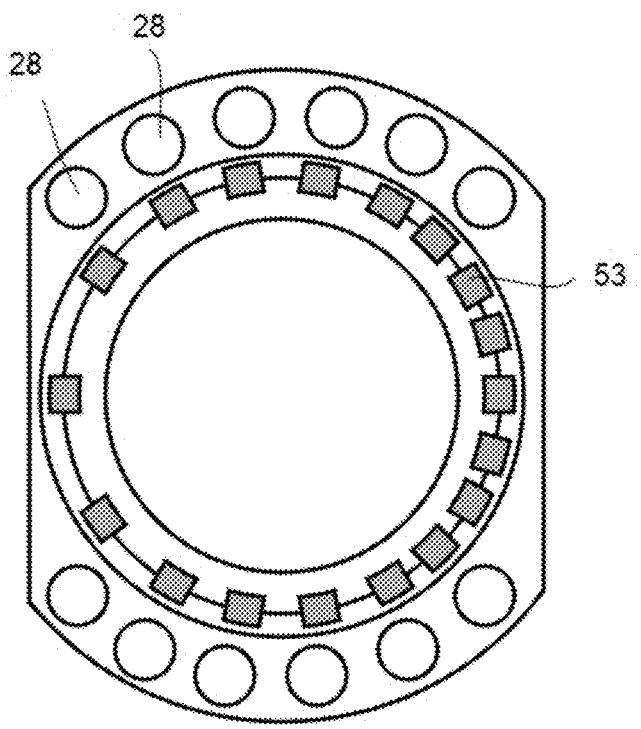
FIG. 6 schematically illustrates a bearing assembly which may form part of a yaw bearing.

FIG. 6 schematically illustrates a bearing assembly which may form part of a yaw bearing. The bearing assembly may be attached to a nacelle, and particularly a bedplate or a frame of the nacelle.

The bearing assembly may include plurality of mounting holes 28 on a flange arranged outside a diameter of the tower. As shown before, yaw drives may be mounted in these holes. The bearing assembly in this example has a different number of nacelle gliding pads 53 on one side than on the other. Also, in some examples, the material of the pads may be different on the opposing sides (front or rear, upwind or downwind) as well.

In a further aspect of the present disclosure, a direct drive wind turbine having a tower, a nacelle rotatably mounted on the tower through a gliding yaw bearing, a wind turbine rotor and a generator operatively connected with the wind turbine rotor is provided. The generator and the wind turbine rotor are arranged on an upwind side of the nacelle, and the gliding yaw bearing comprising a disk with an annular gear coupled to the tower and comprising a plurality of gliding pads, and a plurality of calipers attached to the nacelle, wherein the calipers partially enclose the disk with the annular gear, and wherein an arrangement of the calipers is different on the upwind side of the nacelle than on the downwind side of the nacelle.

The yaw bearing systems according to all examples illustrated herein involve gliding pads, and in particular they all include bottom gliding pads, upper gliding pads, and radial gliding pads. In some examples involving gliding pads, no radial gliding pads, and only upper and bottom gliding pads may be used. In some examples, the upper and bottom gliding pads may be made of different materials because they maybe subjected to different loads. In particular, a first material may be used for the upper gliding pads at the downwind side and for the bottom gliding pads at the upwind side, and a second material may be used for the bottom gliding pads at the downwind side and for the upper gliding pads at the upwind side.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A gliding yaw bearing system for use in a wind turbine comprising:
   a first bearing part configured to attach to a tower of the wind turbine, the first bearing part being an annular disk with gear teeth on a radial facing surface;
   a second bearing part configured to attach to a nacelle of the wind turbine;
   the second bearing part comprising an upwind section having a first configuration for supporting a first bending load in a first direction and a downwind section opposite the upwind section having a second configuration for supporting a second bending load in a second direction different from the first direction,
   the second bearing part comprising calipers that engage with the annular disk, the calipers comprising a first plurality of calipers in the upwind section and a second plurality of calipers in the downwind section,
   wherein a number of the first plurality of calipers per unit length along a circumference of the first configuration is less than a number of the second plurality of calipers per the unit length along a circumference of the second configuration and/or wherein each of the first plurality of calipers have a cross-sectional area taken along an axial-radial plane that is less than a cross-sectional area taken along an axial-radial plane of each of the second plurality of calipers.

2. The gliding yaw bearing system according to claim 1, wherein the downwind section of the second bearing part is configured to support higher bending loads than the upwind section.

3. The gliding yaw bearing system according to claim 1, wherein the second bearing part comprises a plurality of nacelle gliding pads attached to one or both of the first and second plurality of calipers.

4. The gliding yaw bearing system according to claim 3, comprising a greater number of the nacelle gliding pads in the downwind section of the second bearing part than in the upwind section of the second bearing part.

5. The gliding yaw bearing system according to claim 3, wherein the nacelle gliding pads in the downwind section of the second bearing part are made from a different material than the nacelle gliding pads in the upwind section of the second bearing part.

6. The gliding yaw bearing system according to claim 1, wherein the first bearing part comprises, one or more tower gliding pads.

7. The gliding yaw bearing system according to claim 6, wherein the one or more tower gliding pads are attached to an upper surface of the annular disk.

8. The gliding yaw bearing system according to claim 7, wherein the first and second plurality of calipers comprise bottom gliding pads configured to contact a bottom of the annular disk.

9. The gliding yaw bearing system according to claim 7, wherein the first and second plurality of calipers comprise radial gliding pads configured to contact a second radial facing surface of the annular disk.

10. The gliding yaw bearing system according to claim 9, wherein the radial gliding pads are wedge shaped.

11. The gliding yaw bearing system according to claim 1, wherein the first plurality of calipers comprise a spring to increase friction between the first bearing part and the second bearing part.

12. A wind turbine comprising a tower, a nacelle rotatably mounted on the tower, and a gliding yaw bearing system, wherein the gliding yaw system further comprises:
   a first bearing part configured to attach to the tower, the first bearing part being an annular disk with gear teeth on a radial facing surface;
   a second bearing part configured to attach to the nacelle;
   the second bearing part comprising an upwind section having a first configuration for supporting a first bending load in a first direction and a downwind section opposite the upwind section having a second configuration for supporting a second bending load in a second direction different from the first direction,
   the second bearing part comprising calipers that engage with the annular disk, the calipers comprising a first plurality of calipers in the upwind section and a second plurality of calipers in the downwind section,
   wherein a number of the first plurality of calipers per unit length along a circumference of the first configuration is less than a number of the second plurality of calipers per the unit length along a circumference of the second configuration and/or wherein each of the first plurality of calipers have a cross-sectional area taken along an axial-radial plane that is less than a cross-sectional area taken along an axial-radial plane of each of the second plurality of calipers.

13. The wind turbine according to claim 12, wherein the wind turbine is a direct drive wind turbine.

* * * * *